United States Patent [19]
Fujiwara

[11] Patent Number: 6,095,693
[45] Date of Patent: Aug. 1, 2000

[54] ONE-WAY CLUTCH

[75] Inventor: Hideki Fujiwara, Osaka, Japan

[73] Assignee: Koyo Seiko Co., Ltd., Osaka, Japan

[21] Appl. No.: 09/276,761

[22] Filed: Mar. 26, 1999

[30] Foreign Application Priority Data

Apr. 2, 1998 [JP] Japan .................................. 10-089815
Mar. 12, 1999 [JP] Japan .................................. 11-066137

[51] Int. Cl.[7] ............................... F16C 33/00; F16D 3/34
[52] U.S. Cl. ........................... 384/625; 192/41 R; 192/45; 29/898.13
[58] Field of Search ............................... 384/625; 192/45, 192/45.1; 29/898.13, 898.63, 898.61, 434; 72/342.91; 148/217, 283

[56] References Cited

U.S. PATENT DOCUMENTS 3,899,225  8/1975  Elmore et al. ........................... 308/174

Primary Examiner—Charles A. Marmor
Assistant Examiner—Tisha D. Waddell
Attorney, Agent, or Firm—Jacobson, Price, Holman & Stern, PLLC

[57] ABSTRACT

An inner ring is shaped in its contour by a cold-shaping treatment and is hardened on its surface by a nitrosulphurizing treatment or a soft-nitriding treatment. As a result, the hardness of the surface of the inner ring is enhanced by the cold-shaping treatment and further by the subsequent hardening treatment. As a result, the inner ring is improved in its wear resistance and its seizure resistance. Moreover, the hardening treatment is effected by the nitrosulphurizing treatment or the soft-nitriding treatment so that it can be suppressed from straining in that treating procedure.

5 Claims, 5 Drawing Sheets

F I G. 4
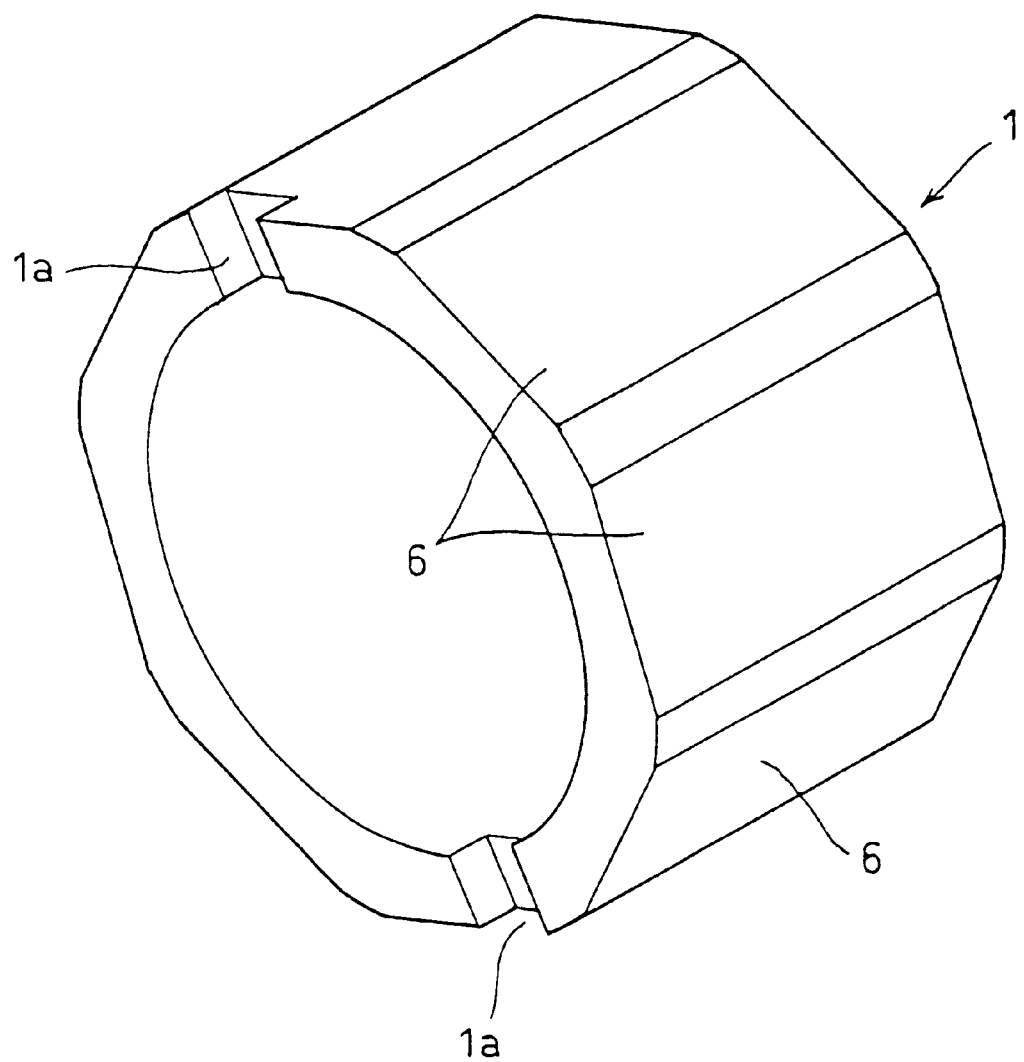

ONE-WAY CLUTCH

BACKGROUND OF THE INVENTION

1. Field of the Invention

The present invention relates to a one-way clutch. This one-way clutch is mounted not only in feed mechanisms for a variety of functional apparatus but also in a pulley belonging to an accessory to be driven through a belt by the crankshaft of an engine of an automobile or the like. This accessory is exemplified by an air conditioner compressor, a water pump, alternator or a cooling fan for the automobile.

2. Description of the Related Art

The one-way clutch is constructed to have two annuli of different diameters (of which the diametrically smaller annulus is an inner annulus whereas the diametrically larger annulus is an outer annulus) arranged concentrically and is interchanged between a locked state, in which the rotating power is transmitted from one annulus to the other, and a free state in which the power transmission is interrupted. A one-way clutch for establishing such locked and free states, wedge-shaped spaces are formed at a plurality of circumferential portions in a radially facing space between the two annuli, and rollers as wedge members are arranged in the wedge-shaped spaces. These wedge-shaped spaces are formed between the cylindrical outer circumference of the inner annulus and the radially outward recessed faces (or cam faces) formed at a plurality of circumferential portions of the inner circumference of the outer annulus.

It has been discovered by us that the one-way clutch having the cam faces on the inner circumference of the outer annulus has a tendency to have the wedge actions weakened at the locked time of the rollers in a high-speed range in which the centrifugal force rises. More specifically, the turning actions of the rollers to the locked position or the free position are guided such that the rollers are pushed onto the cam faces of the outer annulus by the centrifugal force. The centrifugal force acts, in its rising situation, to bring the rollers toward the radially larger sides of the cam faces, i.e., toward the free position. As a result, the delay angle (i.e., the angle made among the locked position, the free position and the turning center) has a tendency to grow more than necessary to delay the locking action.

From this, we have proposed a one-way clutch which has cam faces on the outer circumference of the inner annulus. In this one-way clutch, the inner circumference of the outer annulus for guiding the rollers is made cylindrical to have a constant internal diameter at the individual circumferential portions of the one-way clutch, so that the centrifugal force to act upon the rollers does not act as a force to turn the rollers in the circumferential direction. In short, the wedge actions of the rollers are not weakened by the centrifugal force.

The inner annulus in the one-way clutch, as proposed by us, is shaped in its contour by a machining treatment and is enhanced in its surface hardness by a hardening treatment such as a high-frequency hardening treatment and in its facial accuracy especially of the cam face regions by a polishing treatment. The hardening treatment of this case is performed by the high-frequency hardening treatment so that a strain occurs in the surface of the inner annulus after the hardening treatment. Thus, the facial accuracy is retained by the aforementioned polishing treatment.

However, this working treatment takes troubles to raise the cost for manufacturing the one-way clutch.

SUMMARY OF THE INVENTION

It is, therefore, an object of the invention to provide a one-way clutch which can retain the facial accuracy of the cam face regions of an inner annulus to be formed with cam faces, by a relatively easy and simple treatment.

Another object of the invention is to provide a one-way clutch which can enhance the facial accuracy of the cam face regions even if an after-treatment necessary for the enhancement is omitted.

Still another object of the invention is to provide a one-way clutch which is enabled to lower the manufacture cost by enhancing the facial accuracy even of the after-treatment necessary for the enhancement is omitted.

Still another object of the invention is to provide a one-way clutch which is enabled to have a long lifetime by enhancing the wear resistance of an inner annulus such as an inner ring.

The remaining objects, features and advantages of the invention will become apparent from the description to be made hereinafter.

In order to achieve the above-specified objects, the inner annulus in the invention has a contour shaped by a cold-shaping treatment and includes, on the surface of its contour, a nitrosulphurized hardened layer, a soft-nitrided hardened layer or a spatially hardened layer (hardened by a carburizing treatment or a quenching treatment in a salt bath).

In the one-way clutch having that hardened layer, the hardness of the surface of the inner annulus is enhanced at first by the cold-shaping treatment and further by the subsequent hardening treatment. As a result, a wear or a separation is hard to occur especially on the cam faces of the inner annulus. When the hardening treatment is exemplified by the nitrosulphurizing treatment or the soft nitriding treatment, moreover, a strain is hard to occur on the inner annulus surface in such treating procedure. In the case of the nitrosulphurizing treatment or the soft nitriding treatment, the heat treatment can be performed at a far lower temperature than that of the ordinary hardening treatment to avoid any strain on the inner annulus surface and to provide an excellent wear resistance because the surface hardness is Hv 1,000 or higher.

When the special hardening treatment is exemplified by the carburizing treatment or the quenching treatment in the salt bath, on the other hand, the strain of the inner annulus surface is suppressed in the cooling procedure after the hardening treatment.

BRIEF DESCRIPTION OF THE DRAWINGS

These and other objects as well as advantages of the invention will become clear by the following description of preferred embodiments of the invention with reference to the accompanying drawings, wherein:

FIG. 4 is a perspective view showing an inner ring of FIG. 1;

DETAILED DESCRIPTION OF THE INVENTION

The invention will be described in connection with its preferred embodiments with reference to the accompanying drawings.

A preferred embodiment of the invention will be described with reference to FIGS. 1 to 6.

Figure 1:
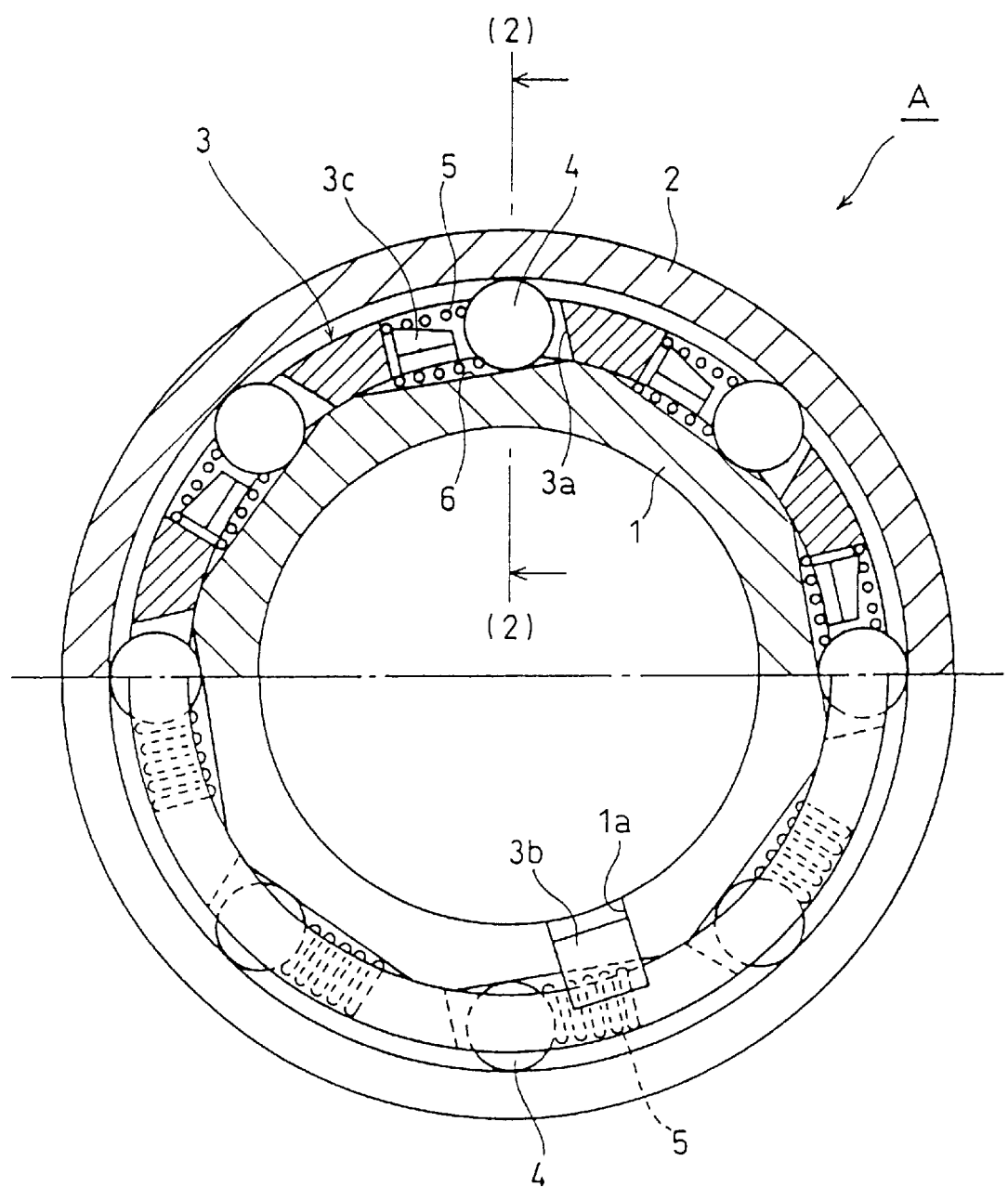
FIG. 1 is a side elevation of a one-way clutch according to a preferred embodiment of the invention with its upper half being presented in section.
Figure 2:
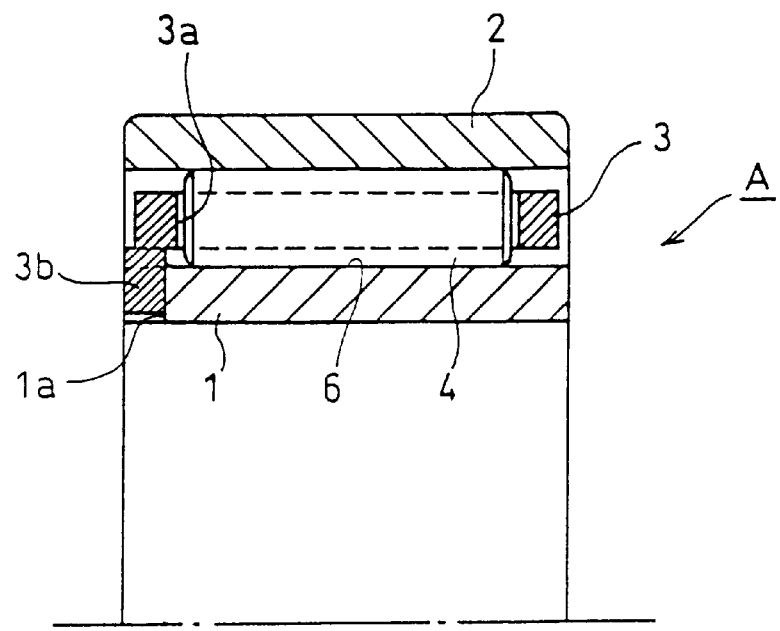
FIG. 2 is a sectional view taken along line (2)—(2) of FIG. 1.
Figure 3:
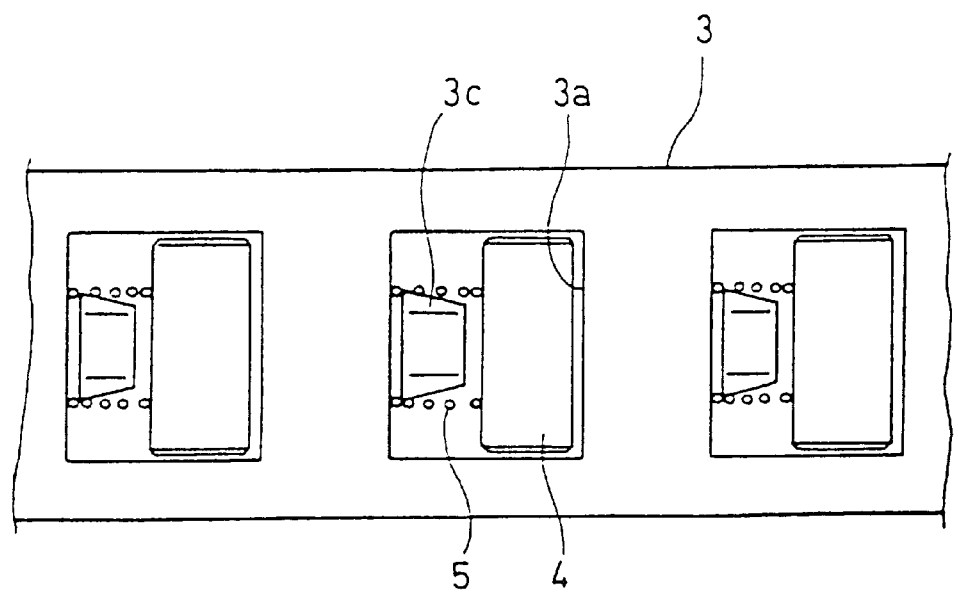
FIG. 3 is a developed top plan view of a pocket portion of a retainer of FIG. 1.
Figure 5:
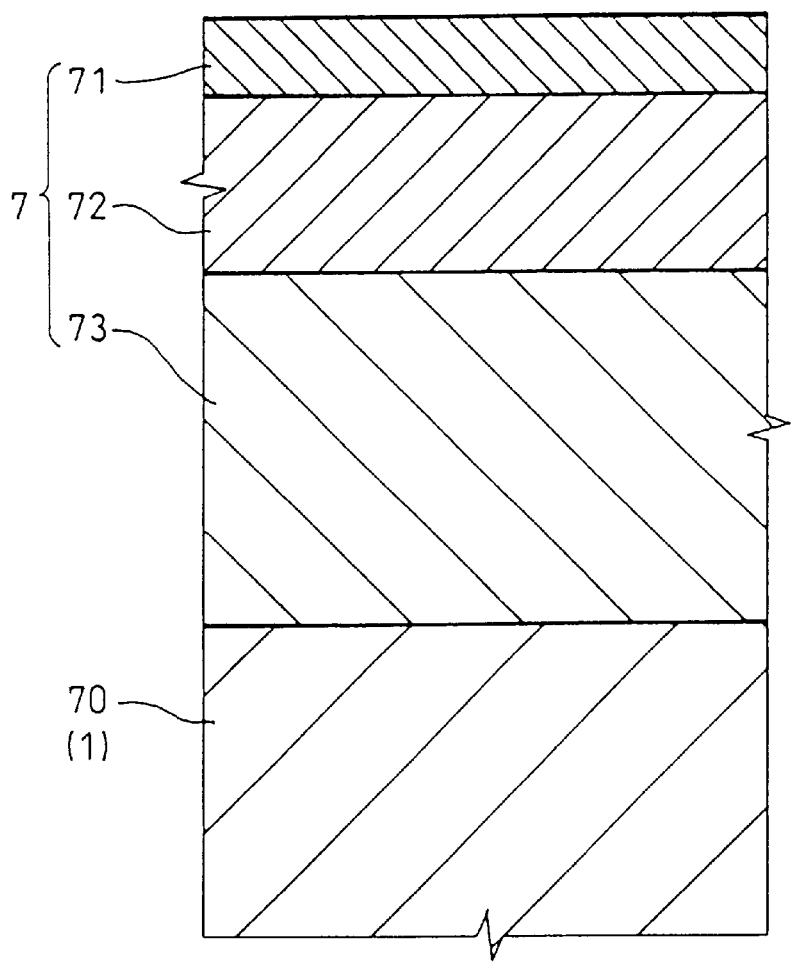
FIG. 5 is an enlarged section of the surface of the inner ring of FIG. 4.

In FIGS. 1 to 5 showing the embodiment of the invention: FIG. 1 is a side elevation of a one-way clutch with its upper half being presented in section; FIG. 2 is a sectional view taken along line (2)—(2) of FIG. 1; FIG. 3 is a developed top plan view of a pocket portion of a retainer; FIG. 4 is a perspective view showing an inner ring; and FIG. 5 is an enlarged section of the surface of the inner ring.

In these figures, reference letter A designates the entirety of the one-way clutch. This one-way clutch A is provided with an inner ring 1 as an inner annulus, an outer ring 2 as an outer annulus, a retainer 3, rollers 4 as rolling members, and coil springs 5. In operation, in accordance with the difference between the rotating speeds of the inner ring 1 and the outer ring 2, the rollers 4 turns to interchange the state, in which the inner and outer rings 1 and 2 rotate relative to each other, and the state in which the rings rotate synchronously, so that the transmission of a rotating power is interrupted and effected.

The aforementioned individual components will be described in detail.

The inner ring 1 has flat key-shaped cam faces 6 at several portions of its outer circumference so that its outer circumference is formed into a polygonal shape (e.g., an octagonal shape).

The outer ring 2 is concentrically fitted through a desired facing space around the outer circumference of the inner ring 1 and formed to have a cylindrical shape at its inner and outer circumferences. Wedge-shaped spaces are formed between the inner circumference of the outer ring 2 and the cam faces 6 of the inner ring 1.

The retainer 3 is interposed between the inner and outer rings 1 and 2 and is press-fitted on the outer circumference of the inner ring 1. The retainer 3 is provided, at positions corresponding to the cam faces 6 of the inner ring 1, with pockets 3a which are extended radially inward and outward. The retainer 3 is so fixed that it is prevented from moving circumferentially and axially with respect to the inner ring 1. Specifically, recesses 1a are formed at two positions opposed at 180 degrees in one axial end face of the inner ring 1. The recesses 1a are opened in a slit shape toward an axial end and radially inward and outward. Heights 3b are mounted in the inner circumference at one axial end side of the retainer 3. These heights 3b are axially press-fitted in the recesses 1a. By these fitting engagements, the retainer 3 is fixed on the inner ring 1.

The rollers 4 are so accommodated one by one in the individual pockets 3a of the retainer 3 as to turn in the circumferential direction. These rollers 4 are arranged in the wedge-shaped spaces which are formed between the cam faces 6 of the inner ring 1 and the outer ring 2.

The coil springs 5 are accommodated one by one in a compressed state in the individual pockets 3a of the retainer 3. These coil springs 5 are caused by their restoring forces to bias the rollers 4 toward the narrower sides (or locked sides) of the wedge-shaped spaces which are formed between the cam faces 6 of the inner ring 1 and the outer ring 2. The coil springs 5 are formed into rectangular springs by winding a spring wire material in a rectangular shape and are fitted around protrusions 3c which are formed integrally with the inner faces of the pockets 3a, so that they are inseparably mounted in the retainer 3.

Here will be described a manufacture of the inner ring 1. The parent material for the inner ring 1 is exemplified by the SCM material or the SCr material according to the Japanese Industrial Standards. The parent material is cold-forged as one example of a cold-shaping operation to have the contour of the inner ring 1. After this, the parent material is hardened at its surface by a hardening treatment such as a nitrosulphurization, a hardening treatment by a soft-nitridation, or a special hardening treatment (such as a carburizing-hardening and an annealing treatment in a salt bath). These individual hardening treatments will be described in the following.

① Here is described a method of forming a nitrosulphurized layer 7, as shown in FIG. 5, by hardening or nitrosulphurizing the inner ring 1.

First of all, the cold-forged inner ring 1 is set in a chamber having a gas-tight structure. After this, the inside of this chamber is evacuated and fed with a desired reactive gas. This reactive gas is exemplified by a mixture of carburizing, nitriding and sulphurizing gases, i.e., $CO_2+(NH_3+N_2)+H_2S$.

Here, the ambient temperature in the chamber for the hardening treatment is 480 to 600° C. (e.g., 550° C. in this embodiment) and is kept for 0.5 to 5 hours (e.g., 120 minutes in this embodiment). After this, the inside of the chamber is cooled with oil or air for a desired time period.

As a result, an impurity factor such as an oxide film inevitably present on the surface of the inner ring 1 is removed by the reactive gases, especially by their sulphurizing gas ($H_2S$) so that the pure surface of the inner ring parent material is exposed to the outside. Subsequently, the N component of the nitriding gas quickly penetrates and diffuses deeply into the inner ring parent material to form the nitrosulphurized layer 7. The depth of this nitrosulphurized layer 7 can be controlled by setting the treatment temperature and the keeping time period.

The nitrosulphurized layer 7 has a layered structure which is composed, in a recited layer inward from the surface side of an inner ring parent material 70(1), of a relatively soft sulphurized layer 71 containing FeS as its principal component, a super-hard and dense nitride compound layer 72 containing $Fe_2-3N$ as its principal component, and a relatively hard nitrided diffusion layer 73 containing N atoms diffusing in the inner ring parent material 70(1).

The treating temperature for forming the nitrosulphurized layer 7 is lower than those of the various thermohardening treatments of the prior art, as described hereinbefore, so that the surface of the inner ring 1 is hardly strained. Here, the surface roughness of the nitrosulphurized layer 7 is kept substantially equal to that (e.g., an average center line roughness Ra=0.7 to 1.0 microns and an average ten-point roughness Rz=3.0 to 6.0 microns) of the object before the layer 7 is formed. Thus in the process for forming the nitrosulphurized layer 7, the size change, as might otherwise be caused by the thermal strain, can be suppressed to make it unnecessary to polish the surface of the inner ring 1, especially the cam faces 6 after this treatment.

Thus, the surface of the inner ring 1 is hardened at first as the cold-forging treatment proceeds, and is further hardened by the subsequent hardening treatment. As a result, the inner ring 1, especially its cam faces 6 are improved in the wear resistance and in the seizure resistance. Moreover, the hardening treatment is exemplified by the nitrosulphurizing treatment, the soft-nitriding treatment or the hardening treatment in the salt bath. In this treatment, the strain of the inner ring 1 is avoided.

Especially if the nitrosulphurizing treatment is performed as the hardening treatment as in the embodiment of the invention, the oxide film inevitably present on the surface of the inner ring 1 is removed to form the nitrosulphurized layer 7, so that the heat treatment can be performed at a temperature far lower than that of the ordinary hardening treatment thereby to avoid the strain of the inner ring 1. As a result, the manufacture cost can be lowered by omitting the troubles for removing the strain by the polishing method as in the prior art.

Figure 6:
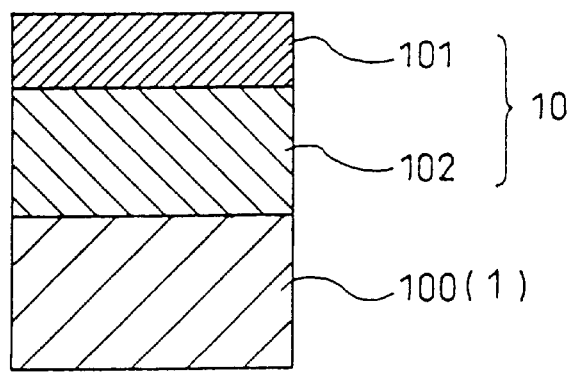
FIG. 6 is an enlarged section of the surface of the inner ring, as produced by another hardening treatment of the invention.

② Here will be described the case in which a nitrided layer 10 shown in FIG. 6 is to be formed by soft-nitriding the inner ring 1.

Specifically, there is prepared as the object the inner ring 1 which is shaped in its contour from a material of the SCM415 according to Japanese Industrial Standards by a cold-forming treatment. On the other hand, the nitriding gas is exemplified by a gas composed of only $NH_3$ or a mixture gas (e.g., an RX gas) composed of $NH_3$ and a carbon source. In the ordinary heat treatment, the temperature is at 800° C. or higher so that the size change is caused by the transformation of the material and by the thermal influences. However, the above-exemplified gas makes a treatment at a temperature of 480 to 600° C. lower than the level for material transformation so that no size change occurs. As a result, the nitrided layer 10 is formed on the surface of the object or the inner ring 1.

After this, the object is cooled with oil or air for a desired time period. The object is held in the nitrogen gas till the end of the cooling treatment so that no oxide if formed on the surface.

The nitrided layer 10 thus formed is composed, as shown in FIG. 6, of a super-hard compound layer 101 containing a nitride such as CrN, $Fe_2N$, $Fe_3N$ or $Fe_4N$ inward from the surface of a metallic parent material 100(1), and an N-atom diffusion layer 102 extending inward from the compound layer 101.

The surface roughness of this nitrided layer 10 is kept substantially equal to that (e.g., an average center line roughness Ra=0.7 to 1.0 microns and an average ten-pint roughness Rz=3.0 to 6.0 microns) of the object before the layer 10 is formed. Here, it has been observed by an electron microscope having a magnification of 400 times that the section of the nitrided layer 10 had an average particle size of 1 micron or less and was formed dense and smooth. On the other hand, the surface of the nitrided layer 10 has a Vickers hardness [Hv] of 800 to 1,000 (under a testing load of 50 gf), which is similar or higher than that of the thermoset product of the prior art. Thus, the size change due to the thermal strain in the process for forming the nitrided layer 10 can be suppressed to omit the polishing treatment which has been necessary in the prior art.

③ Here will be described the case in which the surface of the inner ring 1 is hardened by specially hardening it.

First of all, there is prepared as the object the inner ring 1 which is shaped in its contour from a material such as the SCM material or the SCr material according to Japanese Industrial Standards by a cold-forging treatment. This object is carburized at 800 to 900° C. so that the metallic structure of the object parent material from the austenite into the martensite. This carburized object is not cooled naturally but is annealed in the salt bath. More specifically, the carburized object is gradually cooled at 550° C. or a lower temperature in a solution in which a salt such as a nitrate is heated and dissolved at a temperature not higher than 550° C. As a result, the strain of the surface of the object can be suppressed to omit the polishing treatment which has been necessary in the prior art.

Here, the invention should not be exclusively limited to the embodiment thus far described, but various applications and modifications can be conceived.

(1) The aforementioned embodiment is exemplified by the flat cam faces 6, but recessed faces or bulging faces are contained in the invention.

Figure 7A:
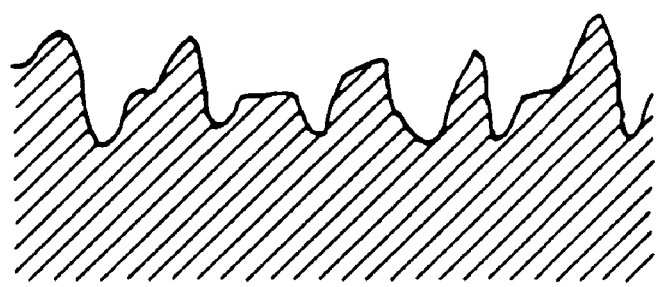
FIG. 7A is a diagram showing the case of a drawing method in a one-way clutch according to still another embodiment of the invention.
Figure 7B:
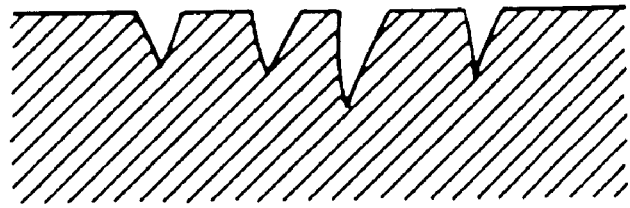
FIG. 7B is a diagram showing a member surface of the case of another working method to be compared with FIG. 7A.

(2) In the aforementioned embodiment, the cold-shaping treatment is effected by the cold-forging treatment but can be exemplified by a cold-drawing treatment. Upon this cold-drawing treatment, an inner ring material such as a pipe material is used and has corrugations, as microscopically shown in FIG. 7A. After the cold-drawing treatment, however, the protrusions of the corrugations are crushed, as shown in FIG. 7B, so that only the recesses are left in the surface to enhance the wear resistance by containing the oil. If the inner ring material thus shaped in its contour by the cold-drawing treatment is nitrided, the hardness of its surface is drastically raised to a level higher than that of another hardening treatment so that the wear resistance is remarkably improved.

While there has been described what is at present considered to be preferred embodiments of the invention, it will be understood that various modifications may be made therein, and it is intended to cover in the appended claims all such modifications as fall within the true spirit and scope of the invention.

What is claimed is:

1. A one-way clutch comprising: an inner annulus; and an outer annulus arranged concentrically with said inner annulus, said two annuli being interchanged between a locked state for synchronous rotations and a free state for relative rotations in accordance with the positions of rollers arranged between said two annuli, wherein said inner annulus has a contour shaped by a cold-shaping treatment and a hardened layer nitrosulphurized on the surface of said contour.

2. A one-way clutch according to claim 1, wherein said hardened layer has a layered structure including, in a recited inward order from the surface of said inner annulus: a soft sulphurized layer; a super-hard and dense nitride compound layer; and a relatively hard nitrided diffusion layer.

3. A one-way clutch comprising: an inner annulus; and an outer annulus arranged concentrically with said inner annulus, said two annuli being interchanged between a locked state for synchronous rotations and a free state for relative rotations in accordance with the positions of rollers arranged between said two annuli, wherein said inner annulus has a contour shaped by a cold-shaping treatment and a hardened layer soft-nitrided on the surface of said contour.

4. A one-way clutch according to claim 3, wherein said hardened layer has a layered structure including, in a recited inward order from the surface of said inner annulus: a super-hard compound layer containing a nitride; and an N-atom diffusion layer.

5. A one-way clutch comprising: an inner annulus; and an outer annulus arranged concentrically with said inner annulus, said two annuli being interchanged between a locked state for synchronous rotations and a free state for relative rotations in accordance with the positions of rollers arranged between said two annuli, wherein said inner annulus has a contour shaped by a cold-shaping treatment and a hardened layer, as carburized and quenched in a salt bath, on the surface of said contour.

* * * * *